United States Patent Office 3,035,897
Patented May 22, 1962

3,035,897
STABLE PEROXIDE CONTAINING PHOSPHATES
Valentin Habernickel, Dusseldorf, Germany, assignor to Henkel & Cie. G.m.b.H., Dusseldorf-Holthausen, Germany, a corporation
No Drawing. Filed Aug. 20, 1957, Ser. No. 679,151
Claims priority, application Germany Aug. 27, 1956
11 Claims. (Cl. 23—107)

This invention relates to stable peroxide containing phosphates.

Sodium metaborate perhydrate is conventionally used as an additive to detergents, washing, cleaning, rinsing or bleaching agents particularly in admixture with alkaline components. It has been proposed to prepare pyrophosphate perhydrates from alkali pyrophosphates and hydrogen peroxide for this purpose. The pyrophosphate perhydrates prepared in this manner however did not prove entirely suitable as the same were only moderately stable particularly when mixed with alkalis and the production thereof was considerably more difficult than that of the conventional sodium metaborate perhydrate.

In accordance with one method, the pyrophosphate perhydrates were prepared by reacting a hydrogen peroxide solution of moderate concentration with an anhydrous pyrophosphate or a pyrophosphate containing water of crystallization. After the reaction the solutions were evaporated to dryness under mild conditions and preferably under vacuum at low temperatures. In accordance with another method, anhydrous pyrophosphate was mixed with a selected quantity of a standard hydrogen peroxide solution so that a solid reaction product would be produced which contained all of the hydrogen peroxide and water in bound form.

One object of this invention is the production of stable peroxide containing phosphates which are excellently suited as additives for washing, cleaning, rinsing and bleaching agents and particularly those which contain alkali components. This and still further objects will become apparent from the following description:

In accordance with the invention, it has been found that stable peroxide containing phosphates may be formed by heating an aqueous solution of an alkali pyrophosphate, and $H_2O_2$ which may additionally contain phosphoric acid or $P_2O_5$ and which has a mol ratio of alkali oxide to $P_2O_5$ of 2:1–1.55 and about 1–4 mols of $H_2O_2$ per mol of $P_2O_5$, to a temperature of about 100–135° C.

The aqueous solution is initially prepared from the components at a low temperature and the heating is preferably effected by passing the solution in the form of a thin film, as for example, film having a thickness of less than 10 mm. over a heated surface such as a heated roller. The film preferably has a thickness of about 1–2 mm. and heating time preferably ranges from about 10 seconds–3 minutes.

The peroxide containing phosphates formed in this manner are extremely stable even in the presence of alkali materials. Particularly great stability is obtained if the mol ratio of alkali oxide to $P_2O_5$ in the starting aqueous solution is 1:1.1–1.5.

The process for the preparation of the stable peroxide containing phosphates in accordance with the invention is relatively simple and favorably compares to that for the production of sodium metaborate perhydrate.

The method for example may be carried out by preparing an aqueous solution of the alkali pyrosphosphate and hydrogen peroxide at a lower temperature (−10° till +40° C., preferably 0–30° C.) and adding concentrated phosphoric acid or phosphorous pentoxide ($P_2O_5$) until the desired ratio of alkali oxide to $P_2O_5$ is reached in the starting solution. The addition of the components however may be effected in any other desired sequence. It is for example possible to start with anhydrous alkali pyrophosphate or even alkali pyrophosphate which contains all or part of its water of crystallization such as for example $Na_4P_2O_7$ or $K_4P_2O_7$. When starting with anhydrous pyrophosphate it is preferable to employ hydrogen peroxide in a concentration of 20–30% when using pyrophosphates which contain water of crystallization, hydrogen peroxide solutions having 40–70% concentration are more suitable.

The quantity of the hydrogen peroxide must be determined at 1–4 and preferably 2–3 mols of $H_2O_2$ for each mol of $P_2O_5$ in the starting solution.

The amount of water in the above described solution may be in the range of 10–90%, preferably 10–60%. But since the water present in the starting solution is removed in the subsequent treatment, it is preferable that the starting solution be as concentrated as possible. This however, is not absolutely necessary for successful operation and dilute solutions, as for example, 20–30% solutions may also be used if desired. As a rule however solutions of greater dilution are not advantageous in operation due to the increased time required for evaporation.

The initial starting solution prepared at the low temperature is conducted over a surface heated to a temperature between 100–135° C. in the form of a relatively thin film. This is preferably done with the use of hot rolls, the solution being conducted over the rolls in a thin layer at temperatures within the range specified and preferably between about 105–124° C. In this connection it is preferable to proceed in such a manner that the layer thickness of the solution flowing over the hot rolls is not more than 10 mm. and is preferably about 1-2 mm. In order to avoid losses of $H_2O_2$, the optimum residence time of the solution and the products on the hot rolls should not exceed from 1–3 minutes.

It is also possible to operate with different types of apparatus using different heated surfaces, as for example, heated endless belts or the like.

Stable products are obtained when operating within the entire range of the invention and a starting solution having an alkali oxide:$P_2O_5$ ratio within the broad range may be obtained without the addition of $P_2O_5$ or phosphoric acid. Products with the highest stability are however obtained when using an alkali oxide to $P_2O_5$ ratio of between 2:1.1–1.5 depending on what pH is desired for the final product. In order to obtain this ratio, it is generally necessary to add phosphoric acid or $P_2O_5$ to the starting solution. The stability of the products in accordance with the invention decreases considerably at both the acid and alkali ends of the broad range set forth above.

The peroxide containing phosphates formed in accordance with the invention are in the form of white generally anhydrous powdered materials of very low bulk weight which are readily soluble in water and depending on the mol ratio of alkali oxide to $P_2O_5$ have a pH range between about 6 and 10. The same are excellently suited for additives for washing, cleaning, rinsing and bleaching agents particularly in admixture with alkali components.

The following examples are given by way of illustration and not limitation:

*Example 1*

4500 grams sodium pyrophosphate-10-hydrate are thoroughly mixed with 4250 grams of 40% $H_2O_2$ and 250 grams of phosphorus pentoxide are slowly added, with cooling, to the mixture (temperature 10° C.).

The mixture is thereupon passed in a thin layer over the hot rolls of a rolling mill at 115–120° C. (delay time 30–40 sec.).

There are obtained about 400 grams of a white, crystalline powder containing 42.2% $P_2O_5$, 31.5% $Na_2O$, 26.3% $H_2O_2$ (mol ratio $Na_2O:P_2O_5:H_2O_2$ equal to 2:1.17:3.04).

The $H_2O_2$ content after storage for 12 months was still 26.1%.

Example 2

2670 grams anhydrous sodium pyrophosphate are dissolved in 5320 grams of 25% $H_2O_2$ and thereupon 420 grams of concentrated phosphoric acid (d.=1.71) are added to the solution while thoroughly stirring at +5–10° C. By rapid evaporation on a rolling mill at 120° C., there are obtained about 3800 grams pyrophosphate perhydrate containing 44.1% $P_2O_5$, 32.5% $Na_2O$, 21.3% $H_2O$ and 2.1% water (mol ratio $Na_2O:P_2O_5:H_2O_2$ equal to 2:1.19:2.40).

Example 3

5180 grams anhydrous sodium pyrophosphate are dissolved in 7450 grams of 30% $H_2O_2$ and 1400 grams concentrated phosphoric acid (d.=1.71) are added to the solution. After evaporation in accordance with Example 1, there are obtained about 7300 grams pyrophosphate perhydrate containing 49.7% $P_2O_5$, 33.0% $Na_2O$, 17.8% $H_2O_2$ (mol ratio $Na_2O:P_2O_5:H_2O_2$ equal to 2:1.31:1.99).

The $H_2O_2$ content after storage for 12 months was 17.75%.

Example 4

6600 grams of anhydrous potassium pyrophosphate are dissolved in double its quantity of 20% $H_2O_2$, whereupon 350 grams phosphorus pentoxide are slowly stirred in at temperatures not above 35° C. and the mixture is passed at 110–115° C. in a layer of a thickness of maximum 2 mm. over the rotating hot rolls of a rolling mill; there are obtained about 8500 grams anhydrous potassium pyrophosphate perhydrate containing 43.3% $K_2O$, 36.8% $P_2O_5$ and 20.1% $H_2O_2$ (mol ratio $K_2O:P_2O_5:H_2O_2$ equal to 2:1.14:2.56).

Example 5

To a solution of 3300 grams anhydrous potassium pyrophosphate in 400 cc. 20% phosphoric acid, there are slowly added at 0–10° C. while continuously stirring 2,000 cc. of 70% $H_2O_2$. After evaporation by means of hot endless belts at 125° C., there is obtained potassium pyrophosphate perhydrate containing 26.5% $H_2O_2$, 37.8% $P_2O_5$, 35.6% $K_2O$ (mol ratio $K_2O:P_2O_5:H_2O_2$ equal to 2:1.4:4.0).

In aqueous solution, the product has a pH of 7.0. The $H_2O_2$ content after storage for 8 months was 26.0%.

Example 6

An excellent boil-washing agent is obtained by preparing a 0.8% solution of a mixture of the following composition:

| | Percent by weight |
|---|---|
| Sodium tripolyphosphate | 25 |
| Alkali silicate (mol ratio $SiO_2:Na_2O$ 3.3:1) | 15 |
| Alkyl benzene sulfonate | 5 |
| Fatty alcohol sulfate | 5 |
| Sodium carbonate | 10 |
| Sodium sulfate | 18 |
| Magnesium silicate | 7 |
| Pyrophosphate-perhydrate as described in Example 2 | 10 |
| Optical brightener | 1 |
| Water | Balance |

Practically the same result is obtained, when 12% pyrophosphate-perhydrate as described in Example 3 is used instead of pyrophosphate-perhydrate, which is above named.

Example 7

99.5 parts pyrophosphate-perhydrate obtained as described in Example 1 and 0.5 part magnesium silicate are mixed. The composition prepared in this manner, when dissolved in water (about 10 grams per liter) gives an excellent bleaching agent.

I claim:
1. Process for the production of stable alkali pyrophosphate perhydrates, which comprises heating an aqueous solution containing an alkali pyrophosphate and $H_2O_2$ and having a molar ratio of alkali oxide to $P_2O_5$ of 2:1–1.55 and about 1–4 mols of $H_2O_2$ per mol of $P_2O_5$ to a temperature of about 100–135° C. by passing the aqueous solution in the form of a thin film over a heated surface, and thereafter recovering the pyrophosphate perhydrate formed.

2. Process according to claim 1, in which said aqueous solution additionally contains a member selected from the group consisting of phosphoric acid and $P_2O_5$ and said aqueous solution has a mol ratio of alkali oxide to $P_2O_5$ of 2:1.1–1.5.

3. Process according to claim 1 in which said heating is effected by passing said aqueous solution in the form of a film having a thickness of less than about 10 mm. over a heated surface.

4. Process according to claim 3 in which said film has a thickness between about 1–2 mm.

5. Process according to claim 4 in which said film is passed over said surface with a time of contact of about 1–3 minutes.

6. Process according to claim 5 in which said heated surface is in the form of an endless heated surface.

7. Process according to claim 2 in which said film has a thickness of less than 10 mm.

8. Process according to claim 7 in which said film has a thickness of about 1–2 mm.

9. Process according to claim 8 in which said solution is contacted with said heated surface for a period of time between about 1–3 minutes.

10. Process according to claim 9 in which the aqueous solution contains 2–3 mols of $H_2O_2$ per mol of $P_2O_5$.

11. Process according to claim 10 in which said heated surface is in the form of an endless heated surface.

References Cited in the file of this patent

UNITED STATES PATENTS

| 1,914,312 | Vieweg | June 13, 1933 |
|---|---|---|
| 2,004,809 | Gilbert et al. | June 11, 1935 |
| 2,141,189 | Lind | Dec. 27, 1938 |
| 2,221,727 | Stenberg | Nov. 12, 1940 |
| 2,235,324 | Moreland | Mar. 18, 1941 |
| 2,491,732 | Hawkins et al. | Dec. 20, 1949 |

OTHER REFERENCES

Hydrogen Peroxide, Schumb et al., chap. 12, pages 641–643, Reinhold Publ. Corp., 1955.